…

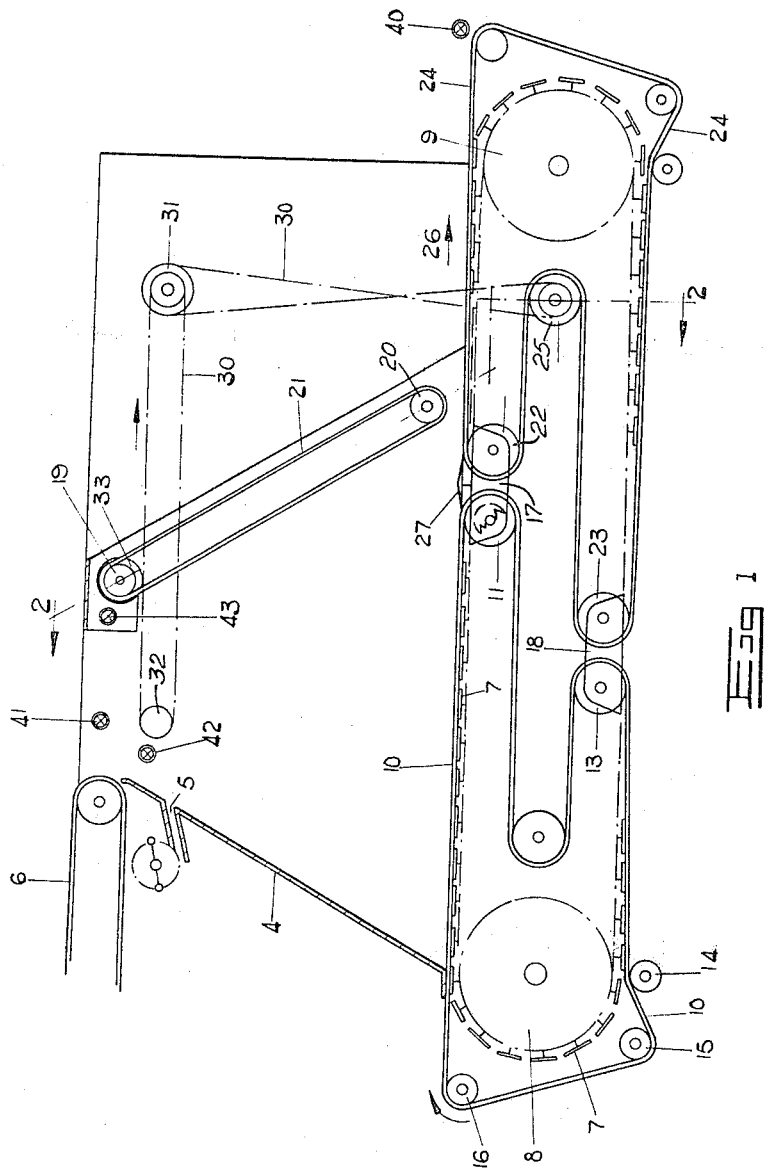

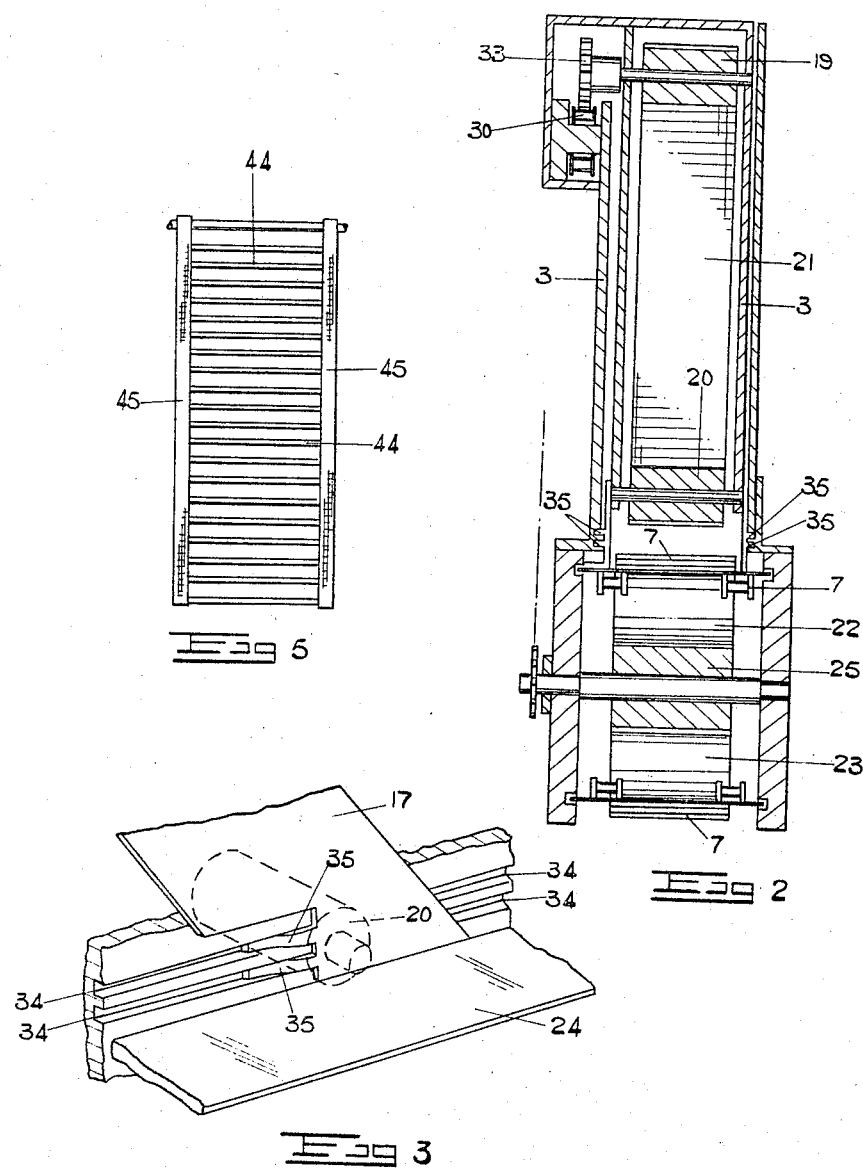

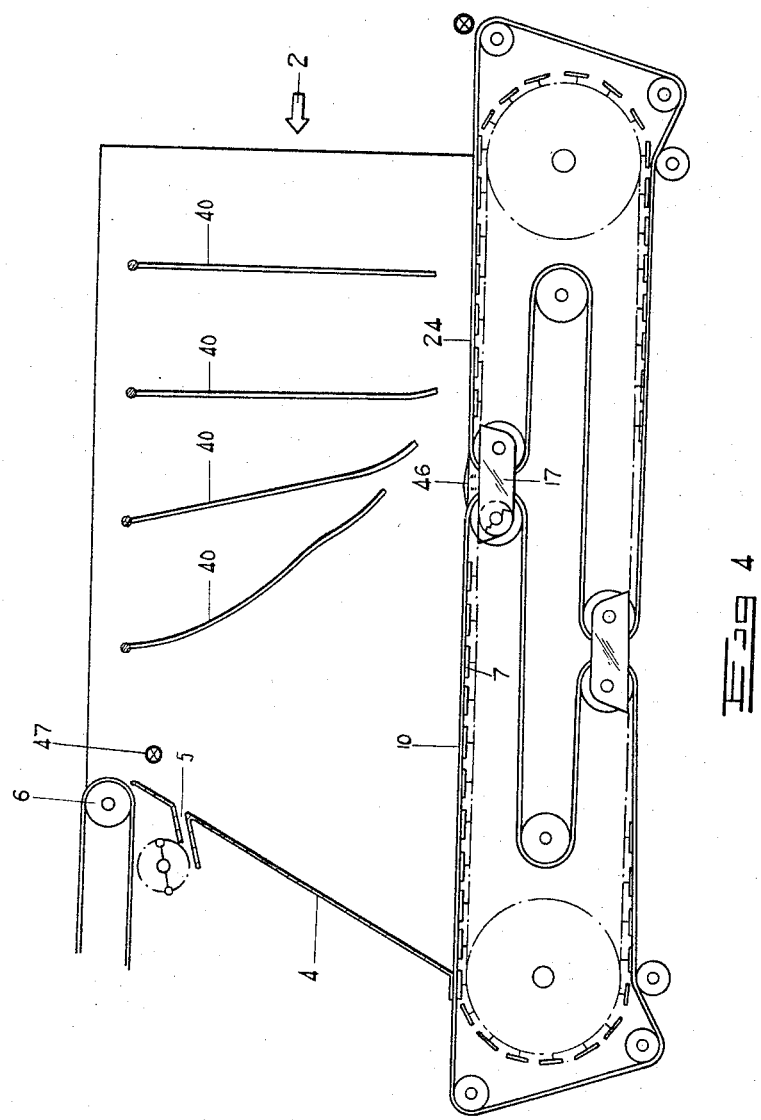

United States Patent Office 3,426,885
Patented Feb. 11, 1969

3,426,885
STORAGE BINS
John P. Rupert, Stellenbosch, Cape Province, Republic of South Africa, assignor to Tobacco Research and Development Institute Limited, Zug, Switzerland
Filed Feb. 2, 1967, Ser. No. 613,503
Claims priority, application Republic of South Africa, Feb. 2, 1966, 66/615; Jan. 18, 1967, 67/311
U.S. Cl. 198—57     8 Claims
Int. Cl. B65g 47/19, 47/44

ABSTRACT OF THE DISCLOSURE

A storage bin consisting in an elongated trough closed at one end over which ore through which the bin is charged; an endless band constituting a false floor to the bin and lying on a floor movable in either direction, the band moving with the floor when the latter moves out of the trough under the closed end and slack in the band being taken up under the floor when the floor moves in the opposite direction; means such as a movable wall or a series of curtains for limting movement of goods off the band; and means to cause the floor to move to expand and contract the length of band and hence the storage capacity of the bin in response to the amount of goods in the bin.

---

This invention relates to storage bins for holding loose goods or discrete articles, such as cigarettes or cigarette filter rods, which may be handled somewhat like loose goods.

An object of the invention is to provide a bin which is adapted to expand and contract its effective storage space according to the demand put on it.

A storage bin according to the invention consists in:
An elongated trough,
A fixed wall at one end of the trough,
A floor to the trough movable in both longitudinal directions of the trough,
A slot in the floor,
An endless flexible band serving as a false floor to the bin, supported by the floor, movable with the floor only when the latter moves from under the fixed wall into the trough and passing through the slot,
Means under the floor to take up slack in the flexible band when the floor moves out of the trough under the fixed wall,
Means to limit the quantity of goods that can slide over the slot when the goods are heaped on the flexible band,
Means for conveying away goods that have crossed the slot, first detecting means for sensing the level of loose goods sliding towards the slot, and
Second detecting means for sensing the level of goods adjacent the fixed wall,
Means for causing the floor to move out of the trough thus causing the slot to move towards the fixed wall when the first detecting means detects a predetermined low level, and
Means for causing the floor to move into the trough, thus causing the slot to move away from the fixed wall when the second detecting means detects a predetermined high level.

Two embodiments of the invention are discussed below with reference to the accompanying drawings, in which:
FIGURE 1 is a diagrammatic section through the length of a bin according to the invention,
FIGURE 2 is a section on the line 2—2 of FIGURE 1,
FIGURE 3 is a fragmentary perspective view of part of the device shown in FIGURE 1,
FIGURE 4 is a view similar to FIGURE 1 of another bin according to the invention, and
FIGURE 5 is a view in the direction of the arrow 2 in FIGURE 4 of a curtain.

The bin shown in the drawings has side walls and a fixed end wall 4. Rod-shaped articles, such as filter rods, are fed to the bin through a slot 5 in the side wall, or by means of a conveyor 6.

The floor proper of the bin is formed by a slatted conveyor 7 around sprockets 8 and 9, either or both of which may be driven. Super-imposed on this conveyor 7 is a conveyor belt 10 passing over idler rollers 13 to 15 and a roller 16, which is free to rotate in the direction of the arrow next to it, but is braked by a suitable brake, say, a ratchet, in the reverse direction. The surface of the roller 16 is knurled to prevent any slippage in the reverse direction.

The rollers 11 and 13 are carried by carriages 17 and 18 respectively carried by the slat conveyor 7. The carriage 17 is extended upwardly and the rollers 19 and 20 of a conveyor belt 21 are journalled on the upward extension. The belt 21 runs at an angle of inclination substantially equal to that of the angle of repose of the rods in the bin, and its inner bight serves as the other end wall of the bin. The roller 11 also has a ratchet similar to the ratchet of the roller 16, and is likewise knurled.

The carriages 17 and 18 also carry rollers 22 and 23 over which pass a belt 24 which is driven by a driver pulley 25. The belt 24 moves in the direction of the arrow 26.

It should be noted that the gap between the roller 20 and the conveyor 24 is at least equal to one thickness of the rods to be stored and preferably to about two thicknesses.

Between the rollers 11 and 22 there is a bridge plate 27 which is wedge-shaped as shown to allow for easy passage of rods over the gap between the rollers.

The essence of the invention is that the inner bight of the conveyor 21 should be able to move to right or left as the case may be, to expand or contract the bin.

The device functions as follows. Normally the belt 24 is driven in the direction shown, and carries rods from the bin under the roller 20. If the bin is to be contracted, the sprocket 8 is driven in a counterclockwise direction. This does not affect the function of the belt 24, but moves the carriage 17 to the left, and the carriage 18 to the right. Note that the length of the belt 10 in the bin does not move, but, as it were, drops away from the under the rods since the roller 16 holds the belt 10.

At the same time the conveyor 21 moves to the left. So that articles in the bin are not crushed, the belt 21 is driven so that its inner bight moves upwardly. The drive is obtained from a sprocket on the shaft of the pulley 25 to a chain 30 passing over sprockets 31 and 32. A suitable clutch (not shown) clutches in the drive to the chain 30. A sprocket 33 on the shaft of the roller 19 picks up the drive from the chain 30. Movement of the sprocket 8 is continued until the bin has suitably contracted.

If the bin has to be expanded, the carriage 17 is caused to move to the right by driving the sprocket 8 in the clockwise direction. In this case the belt 10 is pulled along with the slatted conveyor 7 assisted by the ratchet in the pulley 11 and the belt 21 moves to the right. However, for expansion it is not necessary that the belt 21 be driven so that the clutch on the drive to the chain 30 can remain inoperative.

As the carriage 17 moves to the left or when articles are extracted by the belt 24, the carriage may tend to damage fragile articles in its path. For this reason, the bin side walls 3 have slots 34 and fingers 35 from the carriage 17 projecting into them. The spacing between the fingers and the widths of the fingers are less than a rod diameter.

If one of the side walls of the bin is transparent, the cycle of operations can be manually controlled. However, it is possible to cause the operation to be automatic.

Thus a photocell 40 will control the drive to the pulley 25.

Three photocells 41, 42 and 43 control the expansion and contraction of the bin. The photocell 43 moves with the conveyor 21.

If the bin is too full, the cells 41 and 43 are both covered. The cell 41 then actuates the drive to the sprocket 8 in the clockwise direction. The carriage 17 moves to the right to expand the bin. When the device 42 is uncovered, the drive is stopped.

If the cell 43 is now uncovered, the sprocket 8 is caused to rotate in the opposite direction to close the bin, and at the same time the drive to the chain 30 is actuated. However, the circuit is so arranged that the sprocket 8 cannot rotate unless the belt 24 is moving to extract articles from the bin.

However, to ensure that the bin is correctly filled the cells are latched together. Thus when the cell 41 is covered, any signal received from 43 is ignored until 42 is uncovered. The signal from 43 can thus only cause the bin to close up during the period when the signal from 41 is unlatched by a signal from 42. This arrangement allows the bin to open up at the inlet end, and close up at the outlet end, thus helping to ensure a continuous flow of articles being handled.

The embodiment shown in FIGURES 4 and 5 duplicates in essence much of what has already been described. The end wall 4, the feed conveyor 6, the slot 5, the carriage 17, the slats 7, the endless band 10, and the endless band 24 with their associated structure are in essence the same and do not require additional description.

However, there is no movable end wall and in its place there are curtains 40 which merely serve to prevent rod-shaped articles in the bin from rolling when their angle of repose has been reached. A ladder curtain as appears from FIGURE 5 with transverse rod 44 supported between flexible side pieces 45 at spacing less than the diameters of the articles, serves very effectively.

In addition the gap between the bands 10 and 24 is bridged by a plate 46. The plate 46 is resiliently biased by light springs and when the weight above the plate 46 reaches a predetermined low value, a pair of contacts is bridged. The contacts cause a signal to be given which moves the carriage 17 to the left as long as rods are being fed out of the bin. As soon as the pressure acting on the the plate 46 reaches a predetermined higher value, the carriage stops. The carriage 17 thus moves to a point which the plate 46 seeks out for itself, i.e. it seeks a predetermined layer thickness of rod-shaped articles.

Movement to the right of the carriage 17 becomes necessary when material builds up adjacent the wall 4. This is sensed by a photocell 47.

As before the band 10 moves bodily when the carriage 17 moves to the right and carries material above it to the right. However, when the carriage 17 moves to the left, the band 10 is braked and as it were disappears from the bin space through the slot under the plate 46.

The bins of both embodiments are designed primarily to handle rod-shaped articles in cigarette factories. Thus filter rods and cigarettes may be handled. In the case of tipped cigarettes the diameter at one end is larger than at the other end. Thus, if a bin of any practical height is filled with tipped cigarettes, the cigarettes in the upper layers lie with their untipped ends lower than their tipped ends. To rectify this the invention provides that those slats 7 which are under the band 17 slope in the opposite sense so that in a full bin the upper layers of cigarettes lie substantially horizontally.

I claim:
1. A storage bin for loose goods consisting in: an elongated trough, a fixed wall at one end of the trough, a floor to the trough movable in both longitudinal directions of the trough, a slot in the floor, an endless flexible band serving as a false floor to the bin, supported by the floor, movable with the floor only when the latter moves from under the fixed wall into the trough and passing through the slot, means preventing movement of the flexible band with the floor when the floor moves out of the trough under the fixed wall, means under the floor to take up slack in the flexible band when the floor moves out of the trough under the fixed wall, means to limit the quantity of goods that can slide over the slot when the goods are heaped on the flexible band, first detecting means for sensing the level of loose goods sliding towards the slot, means for conveying away goods that have crossed the slot, and second detecting means for sensing the level of goods adjacent the fixed wall, means for causing the floor to move out of the trough, thus causing the slot to move towards the fixed wall when the first detecting means detects a predetermined low level, and means for causing the floor to move into the trough, thus causing the slot to move away from the fixed wall when the second detecting means detects a predetermined high level.

2. The bin claimed in claim 1 in which the means to limit the quantity of goods is a movable end wall capable of moving with the floor.

3. The bin claimed in claim 2 in which the movable wall is provided by an endless band adapted for its bight that faces the bin interior to move upwardly when the floor is moving.

4. The bin claimed in claim 3 in which the movable wall is inclined at substantially the angle of repose of goods stored in the bin.

5. The bin claimed in claim 1 in which the means to limit the quantity of goods consists in a series of flexible curtains transversely curtaining off the length of the trough, the curtains serving to prevent rolling of the articles stored in the bin.

6. The bin claimed in claim 1 in which the floor is the upper bight of an endless conveyor.

7. The bin claimed in claim 6 in which the endless conveyor is slatted.

8. The bin claimed in claim 1 in which the first detecting means is means for sensing the density of material above the slot.

References Cited

UNITED STATES PATENTS 2,745,410   5/1956   Molins.

EVON C. BLUNK, *Primary Examiner.*

MATTHEW L. AJEMAN, *Assistant Examiner.*

U.S. Cl. X.R.

198—44, 161